United States Patent
Takano

(12) 
(10) Patent No.: US 6,891,978 B1
(45) Date of Patent: May 10, 2005

(54) IMAGE PROCESSING DEVICE AND METHOD OF PROCESSING PICTURE DATA

(75) Inventor: Manji Takano, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 528 days.

(21) Appl. No.: 09/615,071

(22) Filed: Jul. 12, 2000

(30) Foreign Application Priority Data

Jul. 16, 1999 (JP) .......................................... 11-202878

(51) Int. Cl.[7] .............................................. G06K 9/36
(52) U.S. Cl. ................................... 382/284; 382/294
(58) Field of Search ................................ 382/284, 294, 382/299, 300, 173, 176; 358/540, 525, 450, 464, 462, 453

(56) References Cited

U.S. PATENT DOCUMENTS

| | | | | |
|---|---|---|---|---|
| 5,592,305 A | * | 1/1997 | Iwadate et al. ............. | 358/448 |
| 5,724,158 A | * | 3/1998 | Koike ........................ | 358/462 |
| 6,075,905 A | * | 6/2000 | Herman, deceased et al. ... | 382/284 |
| 6,522,787 B1 | * | 2/2003 | Kumar et al. ............... | 382/268 |
| 6,532,036 B1 | * | 3/2003 | Peleg et al. .................. | 348/36 |

FOREIGN PATENT DOCUMENTS

| | | |
|---|---|---|
| JP | 6-141246 | 5/1994 |
| JP | 7-203278 | 8/1995 |
| JP | 7-284013 | 10/1995 |
| JP | 10-69537 | 3/1998 |

* cited by examiner

*Primary Examiner*—Yon J. Couso
(74) *Attorney, Agent, or Firm*—McDermott Will & Emery LLP

(57) ABSTRACT

An image processing apparatus, a method and a product for computer program, for processing data of original images photographed divisionally. The apparatus includes: a first detector which extracts a first region having a first attribute and a second region having a second attribute from original images, which have mutually overlapping regions containing a mutual boundary thereof; and a second detector which processes data of the first and second regions extracted by the first detector so as to detect difference in position between the first regions and between the second regions by a suitable algorithm for their attribute, respectively.

21 Claims, 7 Drawing Sheets

IMAGE PROCESSING DEVICE AND METHOD OF PROCESSING PICTURE DATA

This application is based upon application No. 11-202878 filed in Japan, the contents of which are hereby incorporated by reference.

BACKGROUND OF THE INVENTION

1. Field of the Invention

The present invention relates to an image processing device and a method of processing picture data. More specifically, the present invention relates to the technique for performing image-composing process speedily and precisely.

2. Description of the Related Arts

Conventionally, there have been proposed some cameras, which photograph divided parts of total image of an object like landscape, printed matter, typed sheets and so forth. The total image needs to be composed from original images photographed by the type of the camera, by pasting them together.

Various methods for composing the total image have been described. For example, in Japanese Non-examined Patent Publication No. 6-141246 there is disclosed the method to adjust and interpolate the segmental images depending on the detection of the deviation (i.e. translation and rotation) on the overlapped zone thereof.

In Japanese Non-examined Patent Publication No. 7-284013 there is disclosed the method to detect the deviate angle between line $a_0$–$b_0$ and line $a_1$–$b_1$ depending on the two sets of corresponding points $a_0$, $a_1$; $b_0$, $b_1$ disposed in the respective images. According to those prior methods, some objects, however, can not be detected the deviation of divided images or obtained the desired accuracy of detecting it, because of the feature of images or the condition of the texture in the overlapped zone thereof. In the Japanese Non-examined Application No. 7-203278 there is disclosed the method to check the contrast in order to set the regions measured the correlation therebetween for detecting the displacement thereof. The purpose of the method, however, is to check the contrast and make nothing for pasting the character regions, which include the locally disposed high-frequency texture.

In the Japanese Non-examined Patent Publication No. 10-69537 there is disclosed the method to educe the respective construct information (i.e. layout information) of a plural of original images from frame images thereof, detect the displacement thereof by the detection of the correspondence therebetween regarding to the construct information, and bond them. Though this method enables the respective layout of the constructions and the displacement thereof to be detected, it has no effort for high-speed procedure to the images including both characters and photograph, because it is not accommodative method.

SUMMARY OF THE INVENTION

Accordingly, it is an object of the present invention to provide an image processing device, a method and a computer program product, for processing data of original images photographed divisionally, which enable a reliable processing at a high speed in order to make up a composite image from original images having different attributes such as character and photograph.

In order to achieve the above object, according to one aspect of the present invention, there is provided an image processing device, comprising: a first detector for detecting first regions having a first attribute and second regions having a second attribute, from the original images which have mutually overlapping regions containing a mutual boundary therebetween; and a second detector for processing data of the first regions and the second regions detected by the first detector so as to detect difference in position between the first regions and difference in position between the second regions by a suitable technique for their attribute, respectively.

As a modification, the image processing device further comprises a synthesizer for making up a composite image from the original images, by placing the first regions in overlapping position and the second regions in overlapping position by a suitable technique for their attribute, respectively.

In the device, the first attribute, for example, is that of an image including a character such as literal and mark. In that image, brightness and color change between binary values and the frequency thereof is relatively high. The second attribute, for example, is that of an image including a grading picture such as painting and photograph. In that image, brightness and color change in gradations and the frequency thereof it relatively low. The fist detector detects or extracts the first and second regions depending on the first and second attributes thereof. The second detector and the synthesizer may have two separated parts, one of which is for the first region and the other is for the second region.

The device allow a reliable processing at a high speed in order to make up a composite image from original images having different attributes, depending on a suitable technique for the first and second regions in original images.

As an embodiment, the second detector detects the difference in position between the first regions, based on a piece of information upon nodes of the character therein, and the difference in position between the second regions, based on a piece of information upon a block correlation therebetween. That is, for the second regions, they include few textures of high frequency, and have low cycle spatially. Therefore, the second detector detects the difference in position therebetween relatively roughly and at a high speed, by dividing them into some blocks and analyzing the correlation of concentration contrast thereof between original images. As for the first region, they include high frequency textures. Therefore the second detector detects the difference in position therebetween, by squinting the lines of a character therein and by analyzing the correspondence between nodes thereof.

As an embodiment, the second detector detects the difference in position relatively precisely over a relatively small range between the first regions and the difference in position relatively roughly over a relatively wide range between the second regions. As for the first regions, the second detector search small and narrow search domains therein (for example, by a pixel unit or smaller unit) in order to detects the difference in position therebetween. For example, by moving one of them against the other of them little by little, the second detector detects the movement minimized the difference between their search domains, as the difference in position therebetween. As for the second regions, the second detector search wide search domains therein (for example, all the domain possible to be overlapped) roughly (for example, by ignoring some pixels, or by averaging some pixels) in order to detects the difference in position therebetween.

Thereby, the second detector processes at a high speed, by comparing the correlation roughly in the wide search domains. In this case, if the second detector detects the difference in position in the second regions and then detects that in the first regions by limiting the neighborhood of the displacement position depending on the result of the difference in position between the second regions for the search domains, it is able to finish the processing in a short time by avoiding pointless search for the first region.

As an embodiment, the synthesizer makes up the composite image from the original images, by placing the first regions in the overlapping position by cubic convolution and the second regions in the overlapping position by linear interpolation. As the synthesizer moves the picture, abutting against the standard picture, to the standard picture in order to make up the composite image, interpolate processing is sometimes needed so as to move it by a pixel unit or smaller unit. Suitable interpolate processing for the attribute of the regions may be used. As for the first regions, cubic convolution is suitable even though it is time-consuming, because they include high frequency component and interpolated images can be less deaden by the method. As for the second regions, linear interpolation, which processing time is short, is suitable because they include less high frequency component.

According to another aspect of the present invention, there is provided a method for processing data of original images comprising: a extracting step for extracting first regions having a first attribute and second regions having a second attribute, from the original images which have mutually overlapping regions containing a mutual boundary therebetween; a first detecting step for detecting difference in position between the first-regions extracted in the extracting step; and a second detecting step for detecting difference in position between the second regions extracted in the extracting step.

As an embodiment, the method further comprises: a first composing step for making up a composite image from the original images by placing the first regions in overlapping position by a suitable technique for their attribute; and a second composing step for making up the composite image from the original images by placing the second regions in overlapping position by a suitable technique for their attribute.

The method allows a reliable processing at a high speed in order to make up a composite image from original images having different attributes, depending on a suitable technique for the first and second regions in original images.

As an embodiment, in the above method, the first attribute is that of an image including a character and the second attribute is that of an image including a grading picture.

As an embodiment, in the above method, the first detecting step is carried out based on a piece of information upon nodes of the character and the second detecting step is carried out based on a piece of information upon a block correlation of the grading picture.

As an embodiment, in the above method, the first detecting step is carried out relatively precisely over a relatively small range between the first regions and the second detecting step is carried out relatively roughly over a relatively wide range between the second regions.

As an embodiment, in the above method, the first composing step is carried out by cubic convolution and the second composing step is carried out by linear interpolation.

Also, according to still another aspect of the present invention, there is provided a computer program product for performing the above methods.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE PREFERRED EMBODIMENT

Figure 1A:
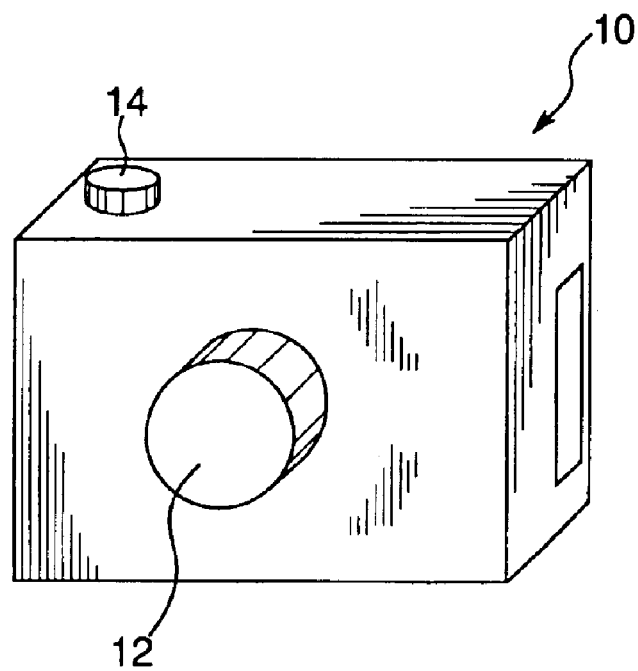
FIG. 1A is a schematic diagram of the camera according to an embodiment of the present invention.

Before the description of the preferred embodiment according to the present invention proceeds, it is to be noted that like or corresponding parts are designated by like reference numerals throughout the accompanying drawings.

A detailed description is made below upon a digital camera, which is an image processing device according to the embodiment of the present invention, with reference to FIG. 1 through FIG. 8.

Figure 1B:
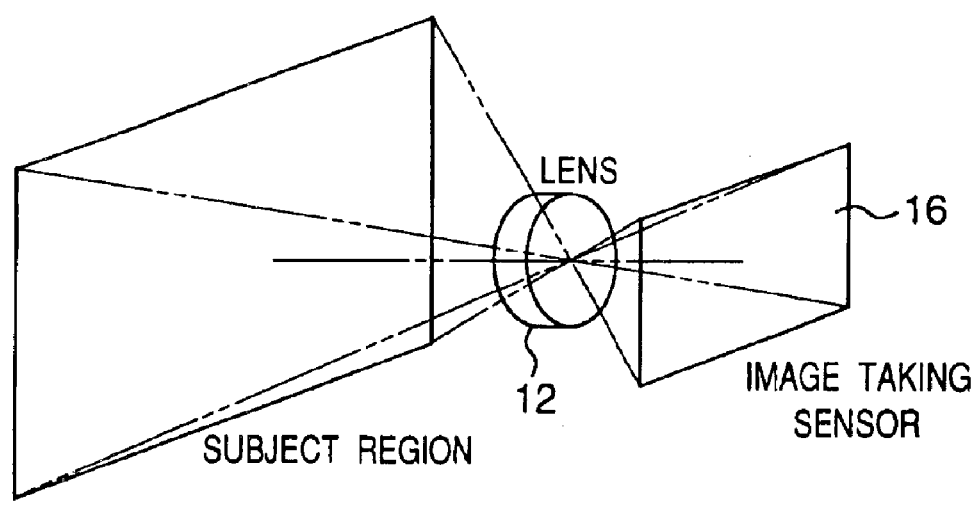
FIG. 1B is a schematic diagram of the optical system in the camera shown in FIG. 1A.

As shown in FIG. 1A, the digital camera 10 (hereinafter, also referred to as "camera") has an image taking start button 14 on the top surface thereof to direct the camera 10 to start recording an image of the subject. A numeral 12 indicates lens. As shown in FIG. 1B, the lens 12 forms an image of the subject region on the focal plane, where the image taking sensor 16 is disposed so as to take that image. The lens 12 and the image taking sensor 16 can move as one, and the camera 10 can photograph a plurality of divided subject regions after one photographing instruction operation so that it takes data of a plurality of images. Specifically, the lens 12 and the image taking sensor 16 are supported in the lower of the center of the camera body by optical system supporting block (not shown), which angle can be changed by a motor 22 (see FIG. 2) so as to change the photo-taking direction of the lens 12 vertically. It is possible to constitute them so as to change the direction laterally and/or vertically.

The camera 10 can make up the composite image with high resolution or wide-angle by pasting a set of images photographed divisionally by changing the direction of the lens 12. The movement of the camera 10 being held in hand during photographing, and positioning precision of the image taking system, optical system and such in the camera 10, even though it is fixed on a tripod and the like, vary, the positioning relationship between the images to be overlapped. Therefore the camera 10 detects difference in position between the images and adjusts the pasting position thereof.

Figure 2:
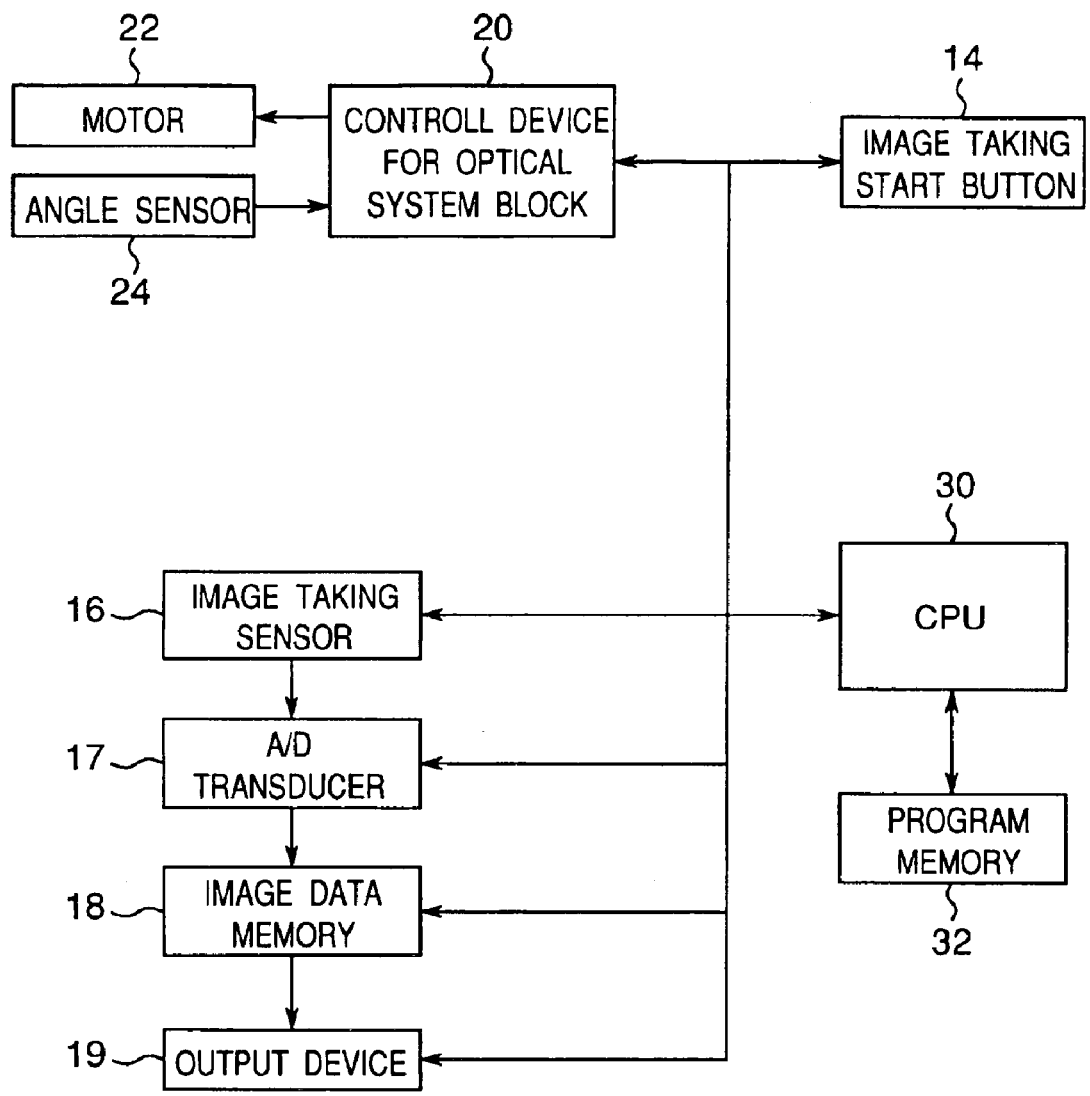
FIG. 2 is a block diagram of the control system in the camera shown in FIG. 1A.

Referring to FIG. 2, the control system in the camera 10 will be described. A CPU 30, which controls the operation of the camera 10, is connected to the image taking start button 14, a control device 20 for the optical system supporting block, the image taking sensor 16, an Analog-to-Digital Converter 17, an image data memory 18, an output device 19, and a program memory 32. The control device 20 controls the rotation of the motor 22 so as to set the photo-taking angle to the desired direction. An angle sensor 24 detects the photo-taking angle, which data is fed back to the control device 20. Image taking sensor 16 operates so as to take in the image focused by the lens 12 and output the image data, which is stored in the image data memory 18. In the case of photographing divisionally, for example, data of right and left divided images are stored in the image data memory 18. According to the program stored in the program memory 32, the CPU 30 can perform the image composing procedures, which include extracting of the regions, detecting of the difference in position, pasting of the images. The image data stored in the image data memory 18 can be send to external computer, printer and such through the output device 19, if needed.

Figure 3:
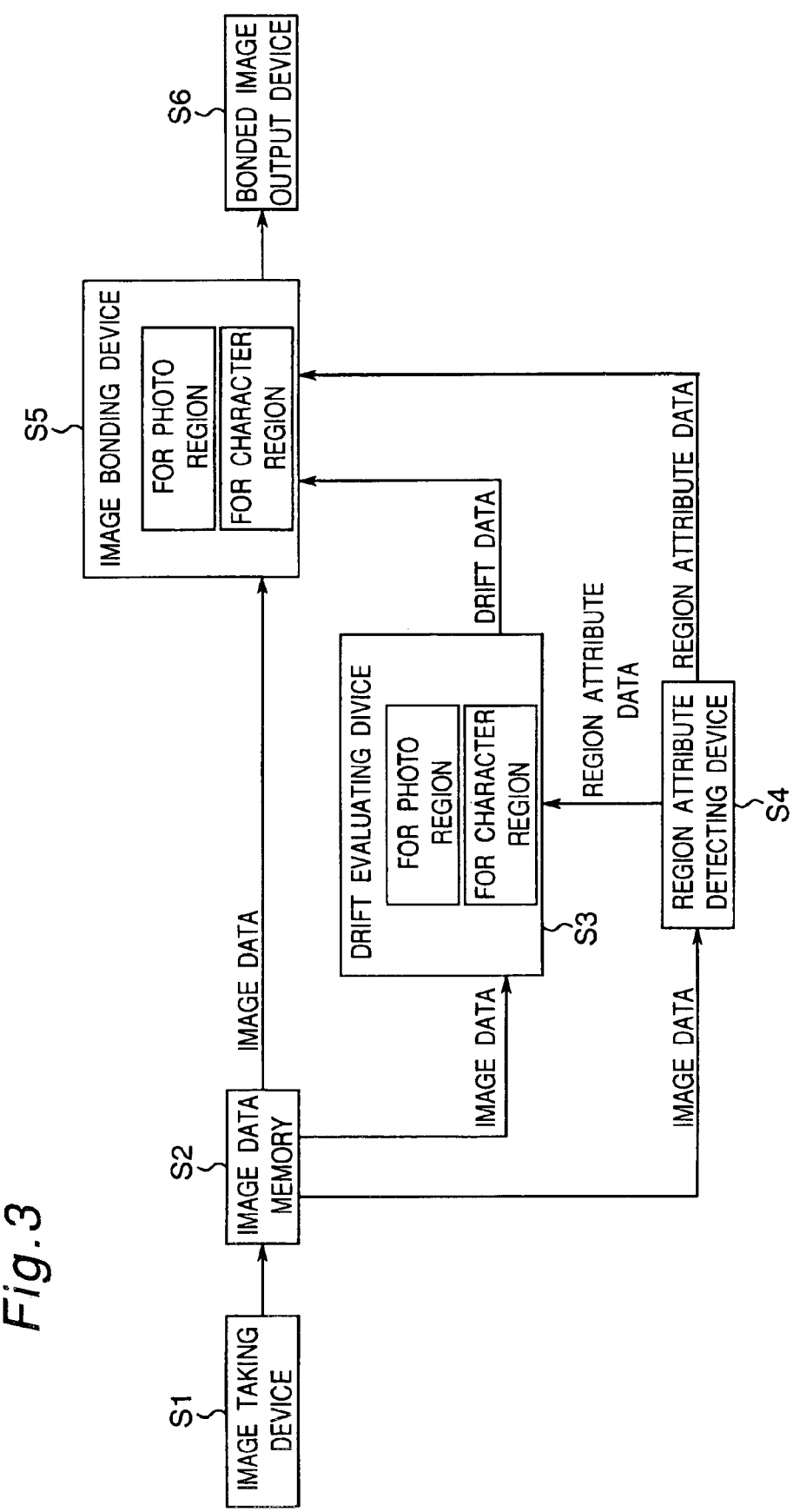
FIG. 3 is a schematic presentation in block form of the procedure to make up a composite image in the camera shown in FIG. 1A.

FIG. 3 illustrates a procedure, performed by the CPU 30, to make up a composite image. The data of image photographed and output by an image taking device S1 is sent to an image data memory S2 and stored temporarily therein. A region attribute detecting device S4 read the image data stored in the image data memory S2 and extract the regions and output the region attribute data. Specifically, the region attribute detecting device S4 can extract three kinds of the regions, which are the character region, the photo region, and the background region, and output the distribution and proportion thereof as the region attribute data. The character region includes the image which brightness and color change in binary form like a letter, mark and such. The photo region includes the image which brightness and color change in gradation form like photograph, painting and such. The background region includes the image which brightness and color hardly change or do not change at all.

A drift evaluating device S3 reads the image data stored in the image data memory S2 and the region attribute data from the region attribute detecting device S4. Then, it detects displacement (or drift, or shift, or gap, or the difference in position) of the same kind of regions between images by suitable algorithm corresponding to the respective region attribute. Then, it determines the amount of the displacement thereof and outputs the data thereof as a drift data. As for the background region, it doesn't determine the amount of the displacement.

An image bonding device S5 reads the drift data from the drift evaluating device S3 and the image data stored in the image data memory S2, and selects suitable algorithm for every region in the images in order to bond them, depending on the image attribute data from the region attribute detecting device S4. Then it pastes every region in the images by the selected algorithm, that is, it adjusts the relative position thereof and composes the overlapped part therebetween. A bonded image output device S6 outputs data of the composite image as the result of pasting the images.

Figure 4:
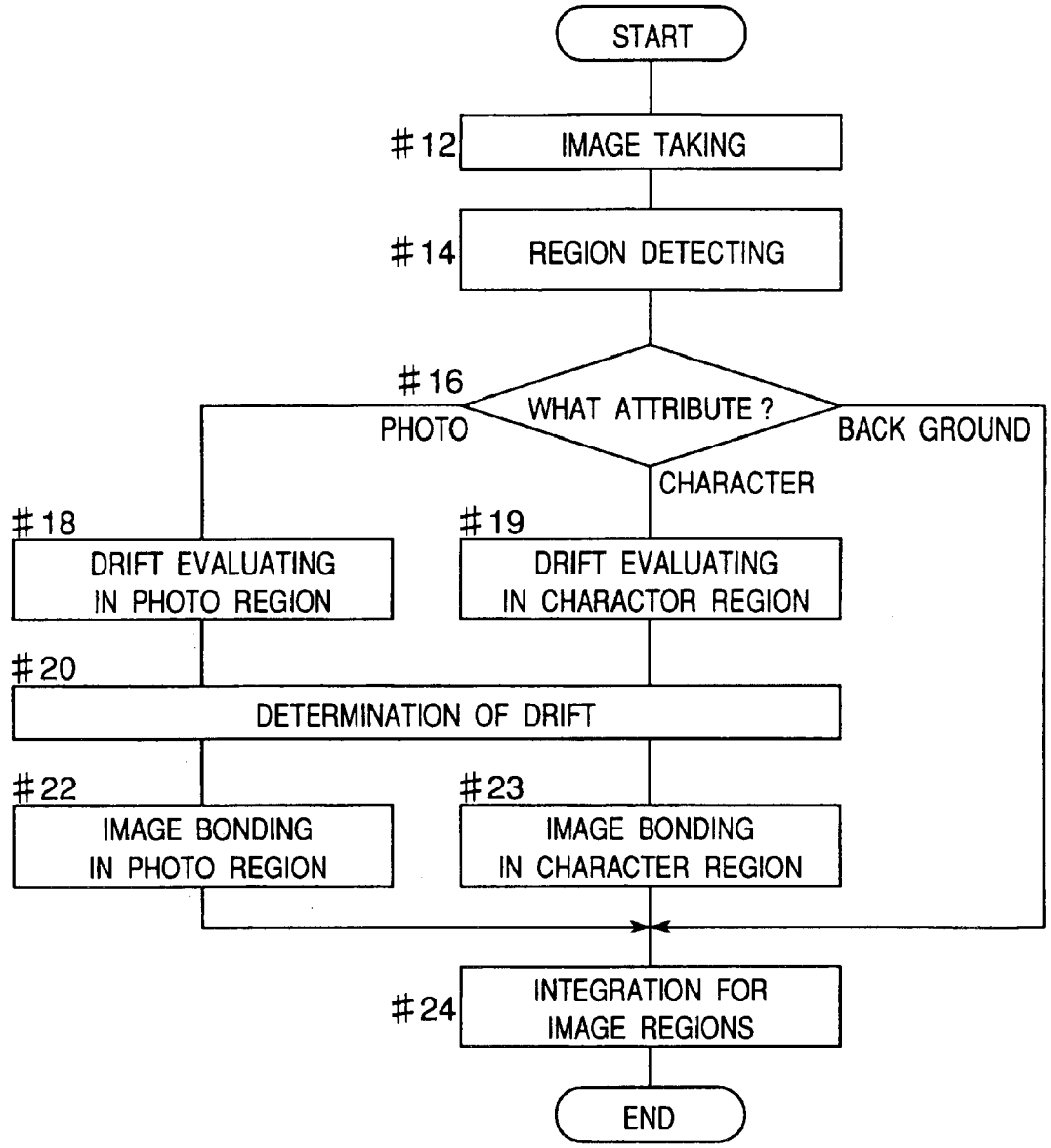
FIG. 4 is a flow chart of the operation of the camera shown in FIG. 1A.

Referring to FIG. 4, an operation of the digital camera 10 is described below.

Figure 6A:
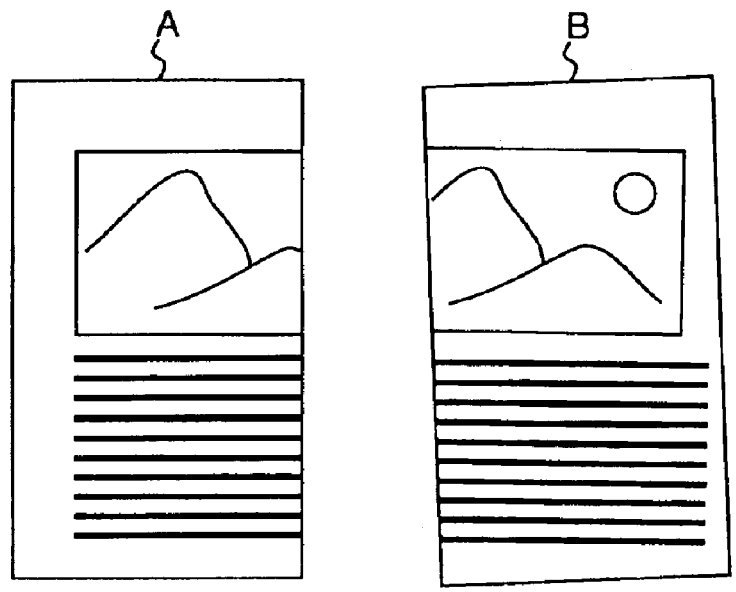
FIGS. 6A and 6B are explanatorily views of divisionally photographing.

After the image taking start button 14 is pressed, the camera 10 takes two divided images in right and left directions (#12). More specifically, as shown in FIG. 6A, the camera 10 takes the first image A in the left direction and then turns the lens 12 toward right and takes the second image B in right direction.

Figure 7:
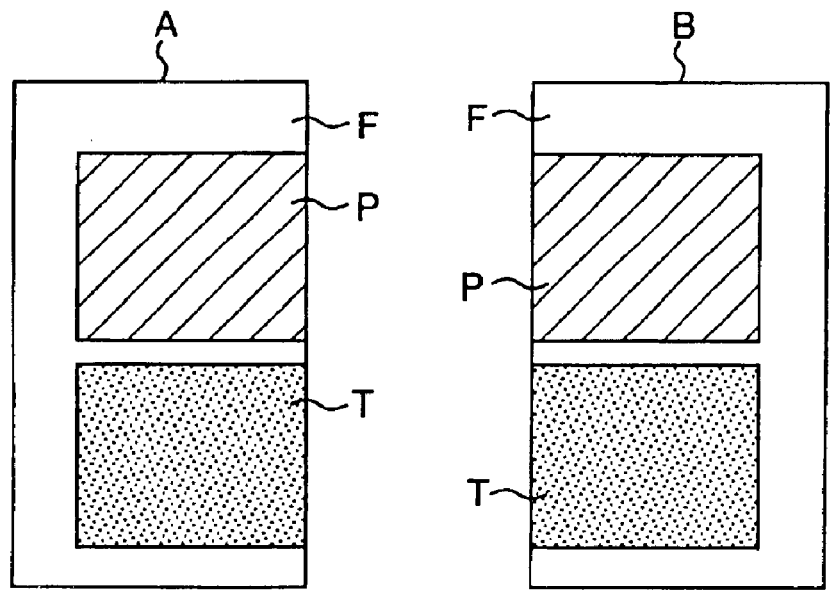
FIG. 7 is an explanatorily view of detecting regions.

Next, the camera 10 detects the regions in the images A and B (#14). For example, it detects the position and range of a character region T, a photo region P, and a background region F, as shown in FIG. 7. The way of detecting the regions is known as described, for example, in Japanese Laid-Open Patent Publication No. 7-288679. It is to detect the attribute for every block having a measure of size, aggregate the blocks with same attribute into rectangle and extract the regions having the same attribute.

Figure 6B:
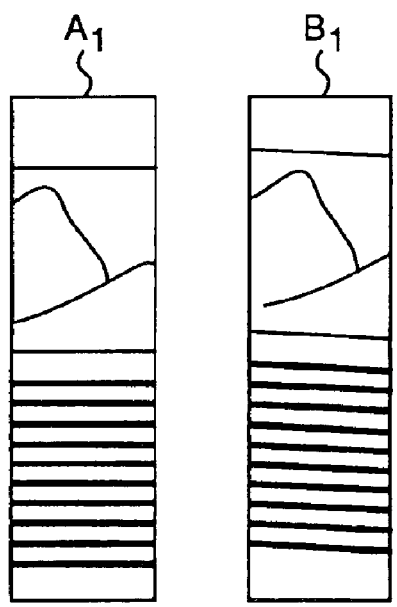

The camera 10 detects the attribute of the overlapped part $A_1$ and $B_1$ in the images A and B, as shown in FIG. 6B, and selects suitable algorithm of detecting the difference in position between corresponding regions having the same attribute for every attribute thereof (#16). Then, it detects the difference in position for every region therebetween by the selected algorithm (#18, #19).

More specifically, the difference in position of the photo regions is detected by the correlation between the density contrast thereof (#18), because the photo region includes a few high frequency textures.

The difference in position of character region is detected by thinning the character and detecting the relationship between the cross points of the thinned character (#19), because the character regions include high frequency texture and are not appropriate for the detection depending on the correlation between their density contrast.

One of those described above process can be performed, when the images include either photo region or character region. As to the background regions, it is difficult to detect the difference in position because they include a few uneven parts therein, and therefore the detecting process may not be performed.

After detecting the difference in position between the regions, the camera 10 analyzes it for every region, and determines the general difference in position, which is called "reference difference in position" hereinafter (#20). When the difference in position between the character regions is equal to that between the photo regions, the difference in position therebetween is determined as the reference difference in position. When the difference in position between the character regions is not equal to that between the photo regions, the camera 10 compares the difference in pixels included in the overlapped parts of the images, moving one of the images against the other by the respective differences in position between character regions and between the photo regions, and one of the differences in position, with which the difference in pixels is less than the other, is evaluated as the reference difference in position.

Depending on the determined reference difference in position, the camera 10 adjusts the arrangement of the regions, and bonds them (#22, #23). As to the overlapped parts, every region in the second image is moved against the first image by the reference difference in position and is composed. As for the part out of the overlapped parts, every region in the second image is moved against the first image by the reference difference in position. That is, every region in the second image is moved against the first image by the reference difference in position.

In the case of moving one of the images against the other of them by the pixel or the less, interpolating process is needed. In this case, according to the attribute of the regions, known technique of interpolating process is applied. For example, as for the character regions, the method of the cubic convolution is used, though it takes long time, since they include high frequency component and interpolated images can be less blurred by the method. As for the photo regions, the method of the liner interpolation is used, because they include less high frequency component and processing time by the method is short.

Figure 8:
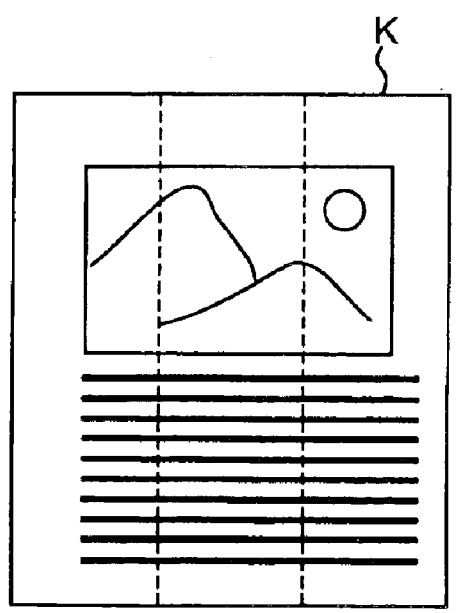
FIG. 8 is an explanatorily view of pasting images.

Finally, the bonded image is integrated, for example, the periphery thereof is cut into the rectangle, and one composite image K as shown in FIG. 8 is accomplished (#24).

Regarding to the background, pasting process is not needed, and therefore it is possible to deal with it at a high speed.

Figure 5:
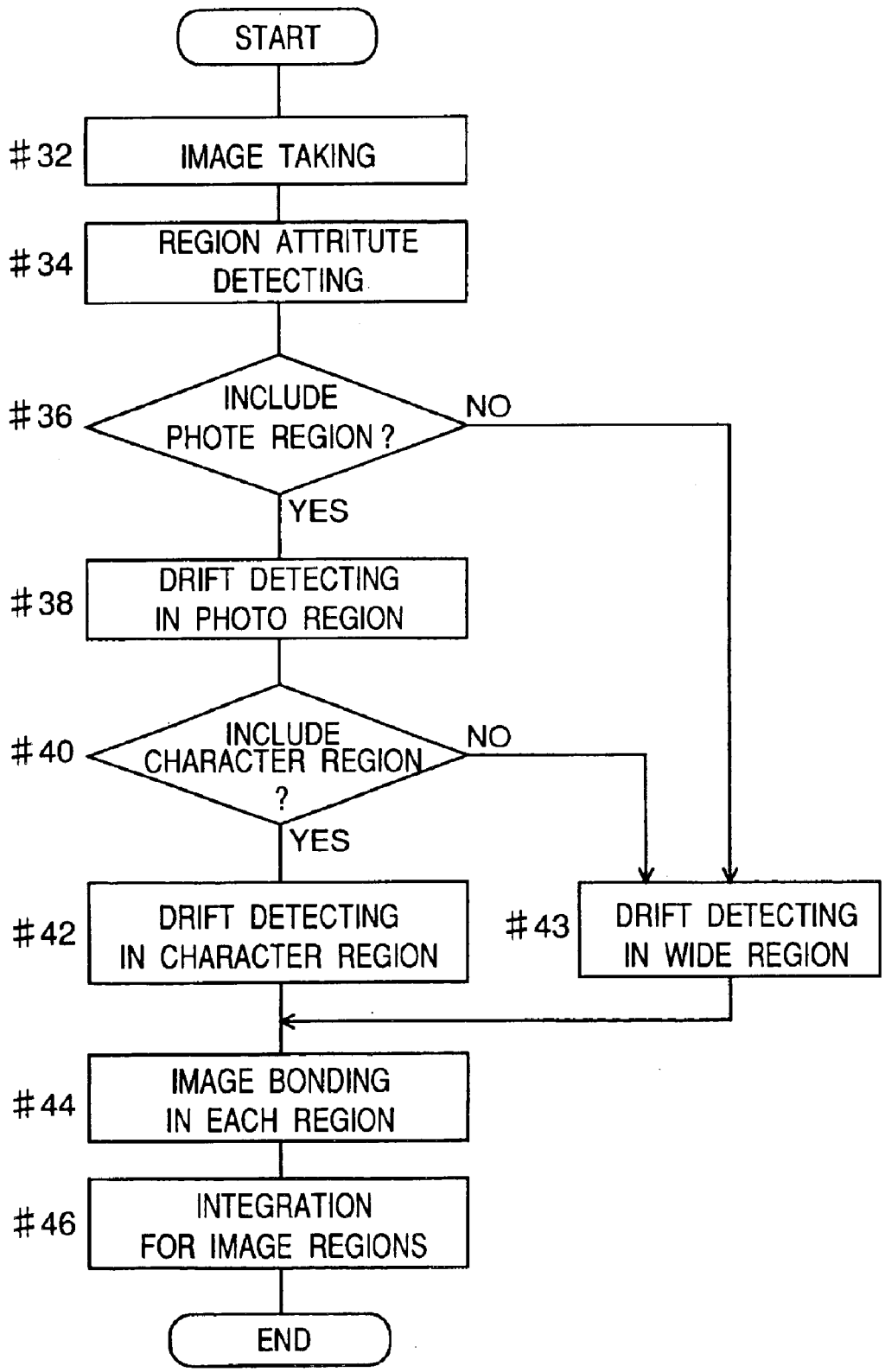
FIG. 5 is an alternative flow chart of the operation of the camera shown in FIG. 1A.

Next, referring to FIG. 5, another operation of the digital camera 10 is described below.

The steps of image taking and region detecting operations (#32, #34) are the same as those of the above-mentioned operations.

If the images includes the photo regions (YES at #36), the difference in position at the overlapped parts is detected (#38). Generally, since the photo regions have low frequency spatially, the correlation of density contrast is searched in wide range (for example, all over the overlapped part) roughly (for example, ignoring some pixels, or by averaging some pixels). Although the range of search is wide, the correlation is compared roughly, and therefore high speed processing is possible.

If the images include the character regions (YES at #40), the difference in position is detected more precisely (by the pixel of the less) (#42). As for the character region, the difference in position is detected by the same way as the above-described manner. As for the character region, a measure of the range of the difference in position can be expected, according to the result of detecting the difference in position as for the photo region. Therefore, the detection for the character regions can be performed in the expected range and finished in the short time by reducing the futile process for character regions.

If both or either of the photo region and the character region is not disposed (NO at #36, or NO at #40), the difference in position is detected more precisely (by the pixel or the less) in wider range. (for example, in the whole of the overlapped part) by suitable algorithm for their attribute (#43).

After detecting the difference in position, the images are adjusted and bonded depending on the detected difference in position (#44) and integrated them (#46), as well as the above-described manner.

The camera 10 as described above, in order to make up a composite image by pasting the images overlapping each other, detects the attribute of the regions in the images, selects the algorithm, including accuracy and range of the detection, of detecting the difference in position and pasting the images adaptively, and processes the every region by the selected algorithm. Thus, the fast and reliable process to make up a composite image from images having different attributes such as character and photograph is possible by position detecting and pasting, adaptively, depending on the attribute of the regions.

Although the present invention has been fully described in connection with the preferred embodiment thereof with reference to the accompanying drawings, it is to be noted that various changes and modifications are also apparent to those skilled in the art.

For example, instead of pasting the composite image in the camera 10, the data of images may be put into a personal computer and the composite image may be made up by the software in the computer. More specifically, the present invention may be applied to the images, not only taken by the angle-changeable camera as well as above described camera 10, but taken several times in different angles by a normal camera or scanned divisionally by the scanner. The procedure to make up a composite image may be proceeded by another computer out of the image taking apparatus. The program of the procedure to make a composite image according to the present invention, may be stored not only in the program memory 32, but also in the other record medium like a floppy disk, CD-ROM and so on.

Also, the regions applied to the present invention may not be limited to above-described photo region and character region. Present invention may be applied to the other kinds of regions, such as the regions including the line drawing or halftone dot, and suitable technique of pasting them can be used according to their attribute.

What is claimed is:

1. An image processing device for processing data of different original images comprising:
    a first detector for detecting first regions having a first attribute and second regions having a second attribute, from the different original images which have mutually overlapping regions therebetween; and
    a second detector for processing data of the first regions and the second regions detected by the first detector so as to detect difference in position between the first regions and difference in position between the second regions by a suitable technique for their attribute, respectively.

2. The image processing device as claimed in claim 1, which further comprises a synthesizer for making up a composite image from the original images, by placing the first regions in overlapping position and the second regions in overlapping position by a suitable technique for their attribute, respectively.

3. The image processing device as claimed in claim 1, in which the first attribute is that of an image including a character and the second attribute is that of an image including a grading picture.

4. The image processing device as claimed in claim 3, in which the second detector detects the difference in position between the first regions, based on a piece of information upon nodes of the character therein, and the difference in position between the second regions, based on a piece of information upon a block correlation therebetween.

5. The image processing device as claimed in claim 4, in which the second detector detects the difference in position relatively precisely over a relatively small range between the first regions and the difference in position relatively roughly over a relatively wide range between the second regions.

6. The image processing device as claimed in claim 2, in which the first attribute is that of a picture including a character and the second attribute is that of an image including grading picture.

7. The image processing device as claimed in claim 6, in which the synthesizer makes up the composite image from the original images, by placing the first regions in the overlapping position by cubic convolution and the second regions in the overlapping position by linear interpolation.

8. A method for processing data of different original images comprising:
    an extracting step for extracting first regions having a first attribute and second regions having a second attribute, from the different original images which have mutually overlapping regions therebetween;
    a first detecting step for detecting difference in position between the first regions extracted in the extracting step via a suitable technique for the first attribute; and
    a second detecting step for detecting difference in position between the second regions extracted in the extracting step via a suitable technique for the second attribute.

9. The method as claimed in claim 8, which further comprises:
    a first composing step for making up a composite image from the original images by placing the first regions in overlapping position by a suitable technique for their attribute; and a second composing step for making up the composite image from the original images by placing the second regions in overlapping position by a suitable technique for their attribute.

10. The method as claimed in claim 8, in which the first attribute is that of an image including a character and the second attribute is that of an image including a grading picture.

11. The method as claimed in claim 10, in which the first detecting step is carried out based on a piece of information upon nodes of the character and the second detecting step is carried out based on a piece of information upon a block correlation of the grading picture.

12. The method as claimed in claim 11, in which the first detecting step is carried out relatively precisely over a relatively small range between the first regions and the second detecting step is carried out relatively roughly over a relatively wide range between the second regions.

13. The method as claimed in claim 9, in which the first attribute is that of a picture including a character and the second attribute is that of an image including grading picture.

14. The method as claim 13, in which the first composing step is carried out by cubic convolution and the second composing step is carried out by linear interpolation.

15. A computer program product for processing data of different original images, which carries out:
an extracting step for extracting first regions having a first attribute and second regions having a second attribute from the different original images, which have mutually overlapping regions therebetween;
a first detecting step for detecting difference in position between the first regions extracted in the extracting step via a suitable technique for the first attribute; and
a second detecting step for detecting difference in position between the second regions extracted in the extracting step via a suitable technique for the second attribute.

16. The computer program product as claimed in claim 15, which further carries out:
a first composing step for making up a composite image from the original images by placing the first regions in overlapping position by a suitable technique for their attribute; and
a second composing step for making up a composite image from original images by placing the second regions in overlapping position by a suitable technique for their attribute.

17. The computer program product as claimed in claim 15, in which the first attribute is that of an image including a character and the second attribute is that of an image including grading picture.

18. The computer program product as claimed in claim 17, in which the first detecting is carried out based on a piece of information upon nodes between the character and the second detecting step is carried out based on a piece of information upon a block correlation of the grading picture.

19. The computer program product as claimed in claim 18, in which the first detecting step is carried out relatively precisely over a relatively small range between the first regions and the second detecting step is carried out relatively roughly over a relatively wide range between the second regions.

20. The computer program product as claimed in claim 16, in which the first attribute is that of a picture including a character, and the second attribute is that of an image including a grading picture.

21. The computer program product as claimed in claim 20, in which the first composing step is carried out by cubic convolution and the second composing step is carried out by linear interpolation.

* * * * *